US008839602B2

(12) United States Patent
Anilovich et al.

(10) Patent No.: US 8,839,602 B2
(45) Date of Patent: Sep. 23, 2014

(54) NON-METHANE HYDROCARBON CONVERSION EFFICIENCY DIAGNOSTIC FOR A DIESEL AFTER-TREATMENT SYSTEM

(75) Inventors: Igor Anilovich, Walled Lake, MI (US); Janean E. Kowalkowski, Northville, MI (US); Cheryl J. Stark, Canton, MI (US); John F. Van Gilder, Webberville, MI (US); Ognyan N. Yanakiev, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 194 days.

(21) Appl. No.: 13/442,926

(22) Filed: Apr. 10, 2012

(65) Prior Publication Data

US 2013/0263577 A1  Oct. 10, 2013

(51) Int. Cl.
*F01N 3/00* (2006.01)

(52) U.S. Cl.
USPC .............. 60/274; 60/276; 60/277; 60/286; 60/295; 60/297

(58) Field of Classification Search
CPC ....... F01N 3/023; F01N 3/025; F01N 3/0253; F01N 3/033; F01N 3/2033; F01N 3/103; F01N 2430/06; F01N 2610/03; F01N 11/00; F01N 11/002; F01N 11/005
USPC ............ 60/274, 276, 277, 286, 295, 297, 311
See application file for complete search history.

(56) References Cited

U.S. PATENT DOCUMENTS

| | | | |
|---|---|---|---|
| 7,127,882 B2 * | 10/2006 | Pfaeffle et al. | 60/285 |
| 7,533,524 B2 * | 5/2009 | Wang et al. | 60/297 |
| 8,011,171 B2 * | 9/2011 | Repkin et al. | 53/432 |
| 8,020,372 B2 * | 9/2011 | Mullins et al. | 60/285 |
| 8,156,730 B2 * | 4/2012 | Guo et al. | 60/280 |
| 8,443,591 B2 * | 5/2013 | LaRose et al. | 60/295 |
| 2010/0050757 A1 | 3/2010 | Liu et al. | |
| 2010/0206060 A1 | 8/2010 | Liu et al. | |

* cited by examiner

*Primary Examiner* — Binh Q Tran
(74) *Attorney, Agent, or Firm* — Quinn Law Group, PLLC

(57) ABSTRACT

A method of assessing non-methane hydrocarbon (NMHC) conversion efficiency in a diesel after-treatment (AT) system having a diesel oxidation catalyst (DOC) arranged upstream of a diesel particulate filter (DPF) includes regenerating the AT system. Additionally, the method monitors DOC inlet and outlet temperatures during the regeneration. The method also assesses whether the DOC is operating at or above threshold efficiency by determining a DOC inlet/outlet temperature difference and comparing the determined inlet/outlet temperature difference with a threshold inlet/outlet temperature difference. The method also monitors DPF outlet temperature if the DOC is operating at or above the threshold efficiency and determines a DOC temperature/DPF outlet temperature difference. The method additionally assesses whether NMHC conversion efficiency of the DPF is at or above a threshold value by comparing the determined DOC temperature/DPF outlet temperature difference with a threshold DOC temperature/DPF outlet temperature difference. A system and a vehicle are also disclosed.

18 Claims, 2 Drawing Sheets

NON-METHANE HYDROCARBON CONVERSION EFFICIENCY DIAGNOSTIC FOR A DIESEL AFTER-TREATMENT SYSTEM

TECHNICAL FIELD

The present disclosure is drawn to a system and a method for assessing non-methane hydrocarbon (NMHC) conversion efficiency of a diesel engine after-treatment (AT) system.

BACKGROUND

Various exhaust after-treatment devices, such as particulate filters and other devices, have been developed to effectively limit exhaust emissions from internal combustion engines. In the case of compression-ignition or diesel engines, a great deal of effort continues to be expended to develop practical and efficient devices and methods to reduce emissions of largely carbonaceous particulates otherwise present in the engine's exhaust gas.

An after-treatment system for a modern diesel engine exhaust typically incorporates a diesel oxidation catalyst (DOC) as one of the devices for such a purpose. A DOC generally contains precious metals, such as platinum and/or palladium, which serve as catalysts to oxidize hydrocarbons and carbon monoxide present in the exhaust flow into carbon dioxide and water. A significant amount of an engine's hydrocarbon emissions may however burn on the DOC and cause elevated temperatures and eventual damage to the catalyst.

Additionally, an after-treatment system may also incorporate a diesel particulate filter (DPF) for collecting and disposing of the sooty particulate matter emitted by the diesel engine prior to the exhaust gas being discharged to the atmosphere. A typical DPF acts as a trap for removing the particulate matter from the exhaust stream. Similar to a DOC, the DPF contains precious metals, such as platinum and/or palladium, which serve as catalysts to further oxidize soot and hydrocarbons present in the exhaust stream. The DPF may be regenerated or cleaned using superheated exhaust gas to burn off the collected particulate.

SUMMARY

A method of assessing non-methane hydrocarbon (NMHC) conversion efficiency in a diesel engine after-treatment (AT) system includes regenerating the AT system which includes a diesel oxidation catalyst (DOC) arranged upstream of a diesel particulate filter (DPF). The method also includes monitoring DOC inlet and outlet temperatures during the regeneration. The method also includes assessing whether the DOC is operating at or above a threshold DOC efficiency by determining the difference between the DOC inlet and outlet temperatures and comparing the determined DOC inlet/outlet temperature difference with a threshold DOC inlet/outlet temperature difference. The method also includes monitoring DPF outlet temperature if the DOC is determined to be operating at or above the threshold DOC efficiency and determining the difference between the DOC operating temperature, and the DPF outlet temperature. The DOC operating temperature may be measured either at the inlet or at the outlet of the DOC. The method additionally includes assessing whether the NMHC conversion efficiency of the DPF in the AT system is at or above a threshold NMHC conversion efficiency by comparing the determined DOC temperature/DPF outlet temperature difference with a threshold DOC temperature/DPF outlet temperature difference.

The DOC may be determined to have failed if the determined DOC inlet/outlet temperature difference is less than the threshold DOC inlet/outlet temperature difference. According to the method, a signal may also be generated indicative of the DOC having failed.

The DPF may be determined to have failed if the determined DOC temperature/DPF outlet temperature difference is less than the threshold DOC temperature/DPF outlet temperature difference. According to the method, a signal may also be generated indicative of the DPF having failed.

The method may additionally include extending the regeneration of the AT system to burn substantially all the particulate matter off the DPF prior to the monitoring of the DPF outlet temperature.

According to the method, each of the acts of regenerating the DOC and DPF system, monitoring DOC inlet and outlet temperatures, assessing whether the DOC is operating at or above the threshold DOC efficiency, monitoring DPF outlet temperature, determining the difference between the DOC temperature and the DPF outlet temperature, assessing whether the DPF is operating at or above the threshold DPF NMHC conversion efficiency, generating signals that the DOC and the DPF have failed, and extending the regeneration of the DOC and DPF system may be accomplished by a controller.

The DOC and the DPF may be located in tandem within a single canister.

The act of regenerating the AT system may be accomplished via an injection of diesel fuel upstream of the DOC into a passage configured to carry an exhaust gas flow from the engine to the DOC.

A system for assessing NMHC conversion efficiency of a diesel engine AT system and a vehicle employing such a system are also provided.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
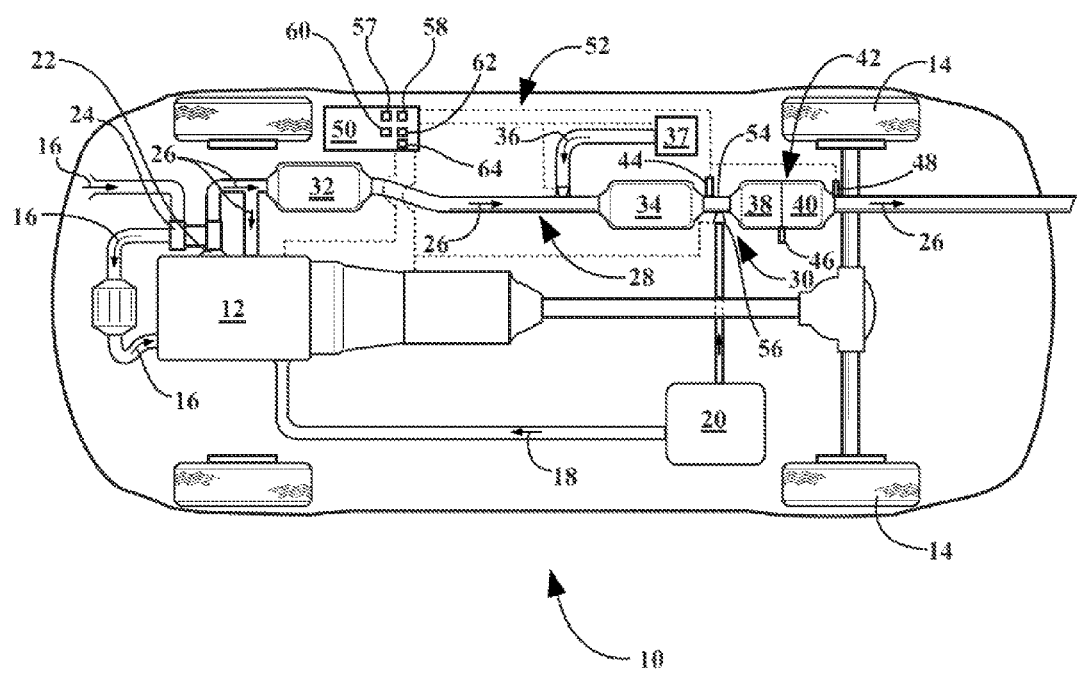
FIG. 1 is a schematic plan view of a vehicle having a diesel engine connected to an exhaust system having an after-treatment (AT) system for reducing exhaust emissions.

Referring to the drawings, wherein like reference numbers refer to like components throughout the several views, FIG. 1 schematically depicts a motor vehicle 10. The vehicle 10 includes a compression-ignition or diesel internal combustion engine 12 configured to propel the vehicle via driven wheels 14. Internal combustion in the diesel engine 12 occurs when a specific amount of ambient air flow 16 is mixed with a metered amount of fuel 18 supplied from a fuel tank 20 and the resultant air-fuel mixture is compressed inside the engine's cylinders (not shown).

As shown, the engine 12 includes an exhaust manifold 22 and a turbocharger 24. The turbocharger 24 is energized by an exhaust gas flow 26 that is released by individual cylinders of the engine 12 through the exhaust manifold 22 following each combustion event. The turbocharger 24 is connected to an exhaust system 28 that receives exhaust gas flow 26 and eventually releases the gas flow to the ambient, typically on a side or aft of the vehicle 10. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

The vehicle 10 also includes a diesel engine after-treatment (AT) system 30. The AT system 30 includes a number of exhaust after-treatment devices configured to methodically remove largely carbonaceous particulate byproducts and emission constituents of engine combustion from the exhaust gas flow 26 and reduce emissions of such particulates into the atmosphere. As shown, the AT system 30 operates as part of the exhaust system 28, and includes a diesel oxidation catalyst (DOC) 32. The primary function of the DOC 32 is reduction of oxides of nitrogen ($NO_X$) and non-methane hydrocarbons (NMHC). Additionally, the DOC 32 is configured to generate nitrogen dioxide ($NO_2$), which is required by a selective catalytic reduction (SCR) catalyst 34 that is arranged downstream of the DOC 32. The DOC 32 typically contains precious metals, such as platinum and/or palladium, which function as catalysts therein to accomplish the above-noted objectives. Generally, with respect to generation of $NO_2$, the DOC 32 becomes activated and reaches operating efficiency at elevated temperatures. Therefore, as shown in FIG. 1, the DOC 32 may be close-coupled to the turbocharger 24 in order to reduce loss of thermal energy from the exhaust gas flow 26 prior to the gas reaching the DOC.

The SCR catalyst 34, on the other hand, is configured to convert $NO_X$ into diatomic nitrogen ($N_2$) and water ($H_2O$) with the aid of the $NO_2$ generated by the DOC 32. The SCR conversion process additionally requires a controlled or metered amount of a reductant having a general name of "diesel-exhaust-fluid" (DEF) 36 when the reductant is employed in diesel engines. The DEF 36 may be an aqueous solution of urea that includes water and ammonia ($NH_3$). The DEF 36 is injected into the exhaust gas flow 26 from a reservoir 37 at a location in the AT system 30 that is downstream of the DOC 32 and upstream of the SCR catalyst 34. Accordingly, the DEF 36 accesses the SCR catalyst 34 as the exhaust gas flow 26 flows through SCR catalyst. An inner surface of the SCR catalyst 34 includes a wash coat that serves to attract the DEF 36 such that the DEF may interact with the exhaust gas flow 26 in the presence of NO and $NO_2$, and generate a chemical reaction to reduce $NO_X$ emissions from the engine 12.

After the SCR catalyst 34, the exhaust gas flow 26 proceeds to a second diesel oxidation catalyst (DOC) 38 arranged in tandem with and upstream of a diesel particulate filter (DPF) 40. The DOC 38 and DPF 40 are housed inside a canister 42. The DOC 38 is configured to oxidize hydrocarbons and carbon monoxide present in the exhaust gas flow 26 into carbon dioxide ($CO_2$) and water. The DPF 40 is configured to collect and dispose of the particulate matter emitted by the engine 12 prior to the exhaust gas flow 26 being discharged to the atmosphere. Accordingly, the DPF 40 acts as a trap for removing the particulate matter, specifically, NMHC, from the exhaust flow. Similar to the DOC 32 described above, each of the DOC 38 and the DPF 40 typically contains precious metals, such as platinum and/or palladium, which function as catalysts in the subject devices to accomplish their respective objectives. After passing through the DOC 38 and DPF 40 inside the canister 42, the exhaust gas flow 26 is deemed to be sufficiently cleaned of the noxious particulate matter and may then be allowed to exit the exhaust system 28 to the atmosphere.

The AT system 30 also includes a first temperature probe 44 configured to sense an inlet temperature of the DOC 38 and a second temperature probe 46 configured to sense an outlet temperature of the DOC 38. The AT system 30 additionally includes a third temperature probe 48 configured to sense an outlet temperature of the DPF 40. Furthermore, the AT system 30 includes a controller 50. The controller 50 may be a stand-alone unit, or be part of an electronic controller that regulates the operation of engine 12. Additionally, the controller 50 is programmed to regulate operation of the engine 12, as well as operation of the exhaust after-treatment devices, namely the DOC 32, SCR catalyst 34, DOC 38, and DPF 40. Each of the first, second, and third temperature probes 44, 46, 48 is in electrical communication with the controller 50 in order to facilitate regulation of the AT system 30 by the controller.

Experience has shown that hydrocarbons emitted by the engine 12 may at times be significant enough such that the exhaust after-treatment devices in the AT system 30 are neither capable of oxidizing nor of slipping the hydrocarbons off at a sufficient rate. Consequently, the DOC 32, SCR catalyst 34, DOC 38, and DPF 40 may be susceptible to having the hydrocarbon emissions deposited thereon. The increased hydrocarbon emissions may consecutively load up the DOC 32, SCR catalyst 34, DOC 38, and DPF 40 in the AT system 30. Such loading-up of the AT system 30 may significantly reduce the operating efficiency of the AT system. As is additionally known, a significant accumulation of hydrocarbon emissions on an exhaust after-treatment device may cause elevated temperatures and eventual damage to the particular device.

Accordingly, the exhaust after-treatment devices of the AT system 30 typically must be regenerated or cleaned after some particular amount of carbon-based soot is accumulated on the respective exhaust after-treatment devices to burn off the collected particulates prior to the occurrence of any AT system damage. Regeneration of an exhaust after-treatment device may, for example, be commenced after a specific mass flow of air has been consumed by the engine for combustion over a period of time. Generally, such regeneration may be accomplished using high temperature exhaust gas flow to burn off the accumulated particles. The exhaust after-treatment devices may be regenerated by directly injecting fuel into the exhaust gas flow upstream of the device and then igniting the injected fuel at an appropriate instance.

The vehicle 10 also includes a system 52 configured to assess and diagnose the state of NMHC conversion efficiency in the DPF 40. The system 52 includes the DOC 38, the DPF 40, the first, second, and third temperature probes 44, 46, 48, as well as the controller 50. The system 52 also includes a passage 54 that is part of the exhaust system 28 and configured to carry the exhaust gas flow 26 from the SCR catalyst 34 to the canister 42. The passage 54 includes a device 56 configured to selectively inject a predetermined amount of diesel fuel into passage 54 upstream of the DOC 38 in order to superheat the exhaust gas flow 26 and perform regeneration of the AT system 30, specifically of the DPF 40. The controller 50 regulates operation of the device 56 to trigger regeneration of the AT system 30 when such is deemed appropriate. The controller 50 may be additionally programmed to extend time-wise the regeneration of the AT system 30 to ensure that substantially all the particulate matter has been burned off the DPF 40 prior to said monitoring of the DPF outlet temperature.

As part of the role the controller 50 plays in the operation of system 52, the controller is additionally programmed to perform a diagnostic of the NMHC conversion efficiency in the AT system 30, specifically within the DPF 40. As part of performing the diagnostic, the controller 50 monitors inlet and outlet temperatures of the DOC 38 during the regeneration process via the first and second temperature probes 44, 46, respectively. The controller 50 also assesses whether the DOC 38 is operating at or above a threshold DOC 38 efficiency by determining the difference between the DOC 38 inlet and DPF 40 outlet temperatures and comparing the determined or actual DOC 38 inlet/outlet temperature difference with a threshold DOC inlet/outlet temperature difference 57. If the DOC 38 is determined to be operating at or above the threshold DOC efficiency, the DOC 38 is deemed to be functional and in no need of replacement.

The controller 50 also monitors a DPF 40 outlet temperature via the third temperature probe 48 in the instance that the DOC 38 is determined to be operating at or above the threshold DOC efficiency. The controller 50 is additionally programmed to determine the difference between the DOC 38 operating temperature and the DPF 40 outlet temperature when the DOC 38 is determined to be operating at or above the threshold DOC 38 efficiency. The operating temperature of the DOC 38 may be measured either at the inlet or at the outlet of the DOC. The controller 50 also assesses whether the NMHC conversion efficiency of the DPF 40 is at or above a threshold NMHC conversion efficiency 58 by comparing the determined or actual DOC temperature/DPF outlet temperature difference with a predetermined threshold DOC temperature/DPF inlet temperature difference 60. If the NMHC conversion efficiency of the DPF 40 is at or above the threshold NMHC conversion efficiency, the DPF 40 is deemed to be functioning on an acceptable level and in no need of being replaced. The threshold DOC temperature/DPF outlet temperature difference 60 may be established empirically by testing a canister 42 having verified clean and highly efficient examples of DOC 38 and DPF 40 and then programmed into the controller 50. Furthermore, the threshold NMHC conversion efficiency 58 may also be empirically correlated to the established threshold DOC temperature/DPF outlet temperature difference 60 and then also programmed into the controller 50. Accordingly, the NMHC conversion efficiency of the DPF 40 is thereby assessed based on the determined NMHC conversion efficiencies of the DOC 38 and the combined DOC 38/DPF 40 system or the DPF alone housed inside the canister 42.

The controller 50 may also be programmed to inform service personnel and/or operator of the vehicle 10 regarding the state of operating efficiency of the DOC 38 and the DPF 40. Accordingly, in the event that the controller 50 determines that the actual DOC inlet/outlet temperature difference is less than the threshold DOC inlet/outlet temperature difference, the DOC 38 may be identified as having failed. In such a case, the controller 50 may additionally generate a sensory signal 62, for example via a predetermined numerical code, or a visual or audible display for service personnel and/or operator of the vehicle 10 that is indicative of the DOC 38 having failed. In the event that the controller 50 determines that the actual DOC temperature/DPF outlet temperature difference is less than the threshold DOC temperature/DPF outlet temperature difference, the DPF 40 may be identified as having failed. Similar to the above-noted situation with a failed DOC 38, the controller 50 may then generate a signal 64 to be displayed to service personnel and/or operator of the vehicle 10 that is indicative of the DPF 40 having failed.

Figure 2:
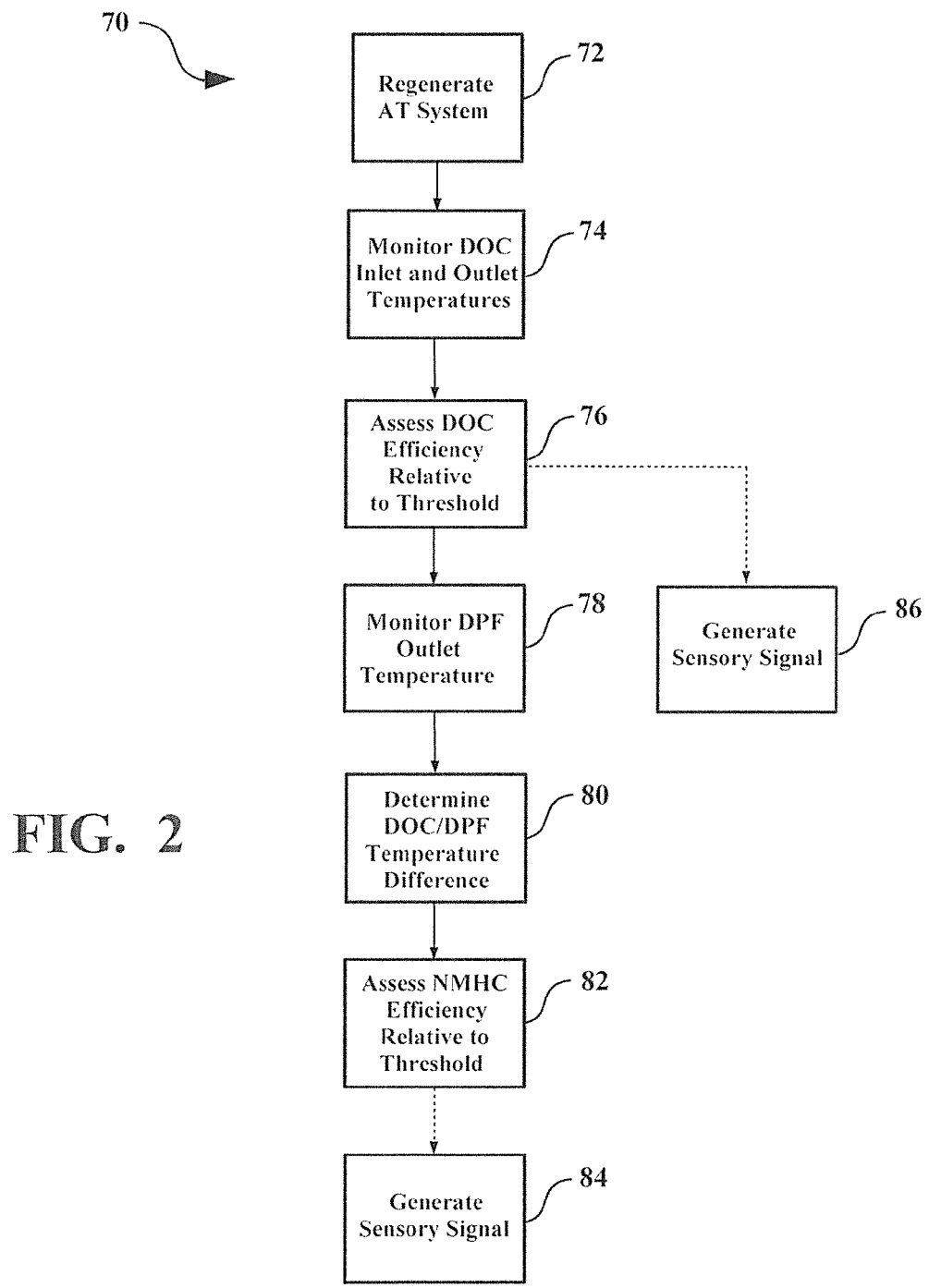
FIG. 2 is a flow diagram of a method for assessing non-methane hydrocarbon (NMHC) conversion efficiency in the AT system of FIG. 1.

FIG. 2 depicts a method 70 of assessing NMHC conversion efficiency in the AT system 30, as described with respect to FIG. 1. Accordingly, the method commences in frame 72, where it includes regenerating the AT system 30. The regeneration of the AT system 30 may be regulated by the controller 50 and accomplished via an injection of diesel fuel upstream of the DOC 38 into the passage 54. From frame 72, the method advances to frame 74, where the method includes monitoring DOC 38 inlet and outlet temperatures by the controller 50 during the regeneration. From frame 74 the method proceeds to frame 76. In frame 76 the method includes the controller 50 assessing whether the DOC 38 is operating at or above the threshold DOC efficiency by determining the difference between the DOC 38 inlet and outlet temperatures and comparing the determined DOC 38 inlet/outlet temperature difference with the threshold DOC inlet/outlet temperature difference 57.

Prior to completing frame 76, the method may also include having the controller 50 extend the regeneration of the AT system 30 following the assessment of efficiency of the DOC 38 to burn substantially all the particulate matter off the DPF 40. Following frame 76 the method proceeds to frame 78, where the method includes the controller 50 monitoring DPF 40 outlet temperature if the DOC 38 is determined to be operating at or above the threshold DOC efficiency. After frame 78 the method advances to frame 80, where the method includes the controller 50 determining the difference between the DOC 38 inlet or outlet temperature and the DPF 40 outlet temperature. After the DOC temperature/DPF outlet temperature difference has been determined in frame 80, the method moves on to frame 82. In frame 82 the method includes the controller 50 assessing whether the NMHC conversion efficiency in the AT system 30 is at or above the threshold NMHC conversion efficiency 58 by comparing the determined DOC 38 temperature/DPF 40 outlet temperature difference with the threshold DOC outlet/DPF inlet temperature difference 60.

Following frame 82 the method may proceed to frame 84 where the controller 50 generates the sensory signal 62 indicative of the DPF 40 having failed if the determined DOC 38 temperature/DPF 40 outlet temperature difference is less than the threshold DOC temperature/DPF outlet temperature difference 60. Additionally, following frame 76 the method may advance to frame 86 where the controller 50 generates the sensory signal 62 indicative of the DPF 40 having failed if the determined DOC 38 temperature/DPF 40 outlet temperature difference is less than the threshold DOC temperature/DPF outlet temperature difference 57.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of assessing non-methane hydrocarbon (NMHC) conversion efficiency in a diesel engine after-treatment (AT) system, the method comprising:
    regenerating the AT system, wherein the AT system includes a diesel oxidation catalyst (DOC) arranged upstream of a diesel particulate filter (DPF);
    monitoring DOC inlet and outlet temperatures during the regeneration;
    assessing whether the DOC is operating at or above a threshold DOC efficiency by determining the difference between the DOC inlet and outlet temperatures and comparing the determined DOC inlet/outlet temperature difference with a threshold DOC inlet/outlet temperature difference;

monitoring DPF outlet temperature if the DOC is determined to be operating at or above the threshold DOC efficiency;

determining the difference between a DOC temperature and the monitored DPF outlet temperature, wherein the DOC temperature is one of the DOC inlet and outlet temperature;

assessing whether the NMHC conversion efficiency of the DPF is at or above a threshold NMHC conversion efficiency by comparing the determined DOC temperature/DPF outlet temperature difference with a threshold DOC inlet/DPF outlet temperature difference;

determining via a controller that the DOC has failed if the determined DOC temperature/DPF outlet temperature difference is less than the threshold DOC temperature/outlet temperature difference; and generating via the controller a signal indicative of the DOC having failed, if the determined DOC temperature/outlet temperature difference is less than the threshold DOC temperature/outlet temperature difference.

2. The method of claim 1, further comprising:
determining that the DPF has failed if the determined DOC inlet/DPF outlet temperature difference is less than the threshold DOC inlet/DPF outlet temperature difference; and generating a signal indicative of the DPF having failed if the determined DOC inlet/DPF outlet temperature difference is less than the threshold DOC inlet/DPF outlet temperature difference.

3. The method of claim 2, further comprising extending the regeneration of the AT system to burn substantially all the particulate matter off the DPF prior to said monitoring of the DPF outlet temperature.

4. The method of claim 3, wherein each of said regenerating the DOC and DPF system, monitoring DOC inlet and outlet temperatures, assessing whether the DOC is operating at or above the threshold DOC efficiency, monitoring DPF outlet temperature, determining the difference between the DOC temperature and the DPF outlet temperature, assessing whether the NMHC conversion efficiency of the DPF is at or above the threshold NMHC conversion efficiency, generating the signal indicative of the DPF having failed, and extending the regeneration of the DOC and DPF system is accomplished by a controller.

5. The method of claim 1, wherein the DOC and the DPF are located in tandem within a single canister.

6. The method of claim 1, wherein said regenerating the AT system is accomplished via an injection of diesel fuel upstream of the DOC into a passage configured to carry an exhaust gas flow from the engine to the DOC.

7. A system for assessing non-methane hydrocarbon (NMHC) conversion efficiency in a diesel engine after-treatment (AT) system, the system for assessing NMHC conversion efficiency comprising:

a passage configured to carry an exhaust gas flow from the engine and an injection of diesel fuel for introduction into the AT system, wherein the AT system includes a diesel oxidation catalyst (DOC) arranged upstream of a diesel particulate filter (DPF);

a first temperature probe configured to sense a DOC inlet temperature;

a second temperature probe configured to sense a DOC outlet temperature;

a third temperature probe configured to sense a DPF outlet temperature; and a controller configured to:
regenerate the AT system;
monitor the DOC inlet and outlet temperatures during the regeneration via the respective first and second temperature probes;
assess whether the DOC is operating at or above a threshold DOC efficiency by determining the difference between the DOC inlet and outlet temperatures and comparing the determined DOC inlet/outlet temperature difference with a threshold DOC inlet/outlet temperature difference;
monitor DPF outlet temperature via the third temperature probe if the DOC is determined to be operating at or above the threshold DOC efficiency;
determine the difference between a DOC temperature and the monitored DPF outlet temperature, wherein the DOC temperature is one of the DOC inlet and outlet temperature; and
assess whether the NMHC conversion efficiency of the DPF is at or above a threshold NMHC conversion efficiency by comparing the determined DOC temperature/DPF outlet temperature difference with a threshold DOC temperature/DPF outlet temperature difference.

8. The system of claim 7, wherein the controller is additionally configured to identify the DOC as having failed if the determined DOC inlet/outlet temperature difference is less than the threshold DOC inlet/outlet temperature difference and generate a signal indicative of the DOC having failed.

9. The system of claim 8, wherein the controller is additionally configured to identify the DPF as having failed if the determined DOC temperature/DPF outlet temperature difference is less than the threshold DOC temperature/DPF outlet temperature difference and generate a signal indicative of the DPF having failed.

10. The system of claim 9, wherein the controller is additionally configured to extend the regeneration of the AT system to burn substantially all the particulate matter off the DPF prior to commencing to monitor the DPF outlet temperature.

11. The system of claim 7, wherein the DOC and the DPF are located in tandem within a single canister.

12. The system of claim 7, wherein the controller is configured to regenerate the AT system by triggering an injection of diesel fuel upstream of the DOC into a passage configured to carry an exhaust gas flow from the engine to the DOC.

13. A vehicle comprising:
a diesel engine configured to propel the vehicle;
an after-treatment (AT) system having a diesel oxidation catalyst (DOC) arranged upstream of a diesel particulate filter (DPF);
an exhaust passage configured to direct an exhaust gas flow from the engine to the AT system;
a first temperature probe configured to sense a DOC inlet temperature;
a second temperature probe configured to sense a DOC outlet temperature;
a third temperature probe configured to sense a DPF outlet temperature; and
a controller configured to:
regenerate the AT system;
monitor the DOC inlet and outlet temperatures during the regeneration via the respective first and second temperature probes;
assess whether the DOC is operating at or above a threshold DOC efficiency by determining the difference between the DOC inlet and outlet temperatures and comparing the determined DOC inlet/outlet temperature difference with a threshold DOC inlet/outlet temperature difference;

monitor DPF outlet temperature via the third temperature probe if the DOC is determined to be operating at or above the threshold DOC efficiency;

determine the difference between a DOC temperature and the monitored DPF outlet temperature, wherein the DOC temperature is one of the DOC inlet and outlet temperature; and assess whether the NMHC conversion efficiency of the DPF is at or above a threshold NMHC conversion efficiency by comparing the determined DOC temperature/DPF outlet temperature difference with a threshold DOC temperature/DPF outlet temperature difference.

14. The vehicle of claim 13, wherein the controller is additionally configured to identify the DOC as having failed if the determined DOC inlet/outlet temperature difference is less than the threshold DOC inlet/outlet temperature difference and generate a signal indicative of the DOC having failed.

15. The vehicle of claim 14, wherein the controller is additionally configured to identify the DPF as having failed if the determined DOC temperature/DPF outlet temperature difference is less than the threshold DOC inlet/DPF outlet temperature difference and generate a signal indicative of the DPF having failed.

16. The vehicle of claim 15, wherein the controller is additionally configured to extend the regeneration of the AT system to burn substantially all the particulate matter off the DPF prior to commencing to monitor the DPF outlet temperature.

17. The vehicle of claim 13, wherein the DOC and the DPF are located in tandem within a single canister.

18. The vehicle of claim 13, wherein the controller is configured to regenerate the AT system by triggering an injection of diesel fuel upstream of the DOC into a passage configured to carry an exhaust gas flow from the engine to the DOC.

* * * * *